(12) United States Patent
Tsai et al.

(10) Patent No.: US 8,901,900 B2
(45) Date of Patent: Dec. 2, 2014

(54) BUCK POWER FACTOR CORRECTION SYSTEM

(75) Inventors: Wen-Tien Tsai, Pingtung County (TW); Ching-Ran Lee, Kinmen County (TW)

(73) Assignee: Industrial Technology Research Institute, Hsinchu (TW)

( * ) Notice: Subject to any disclaimer, the term of this patent is extended or adjusted under 35 U.S.C. 154(b) by 436 days.

(21) Appl. No.: 13/351,838

(22) Filed: Jan. 17, 2012

(65) Prior Publication Data

US 2013/0082666 A1 Apr. 4, 2013

(30) Foreign Application Priority Data

Sep. 30, 2011 (TW) .............................. 100135483 A

(51) Int. Cl.
*G05F 1/59* (2006.01)
*H02M 1/42* (2007.01)

(52) U.S. Cl.
CPC .... *H02M 1/4208* (2013.01); *H02M 2001/4291* (2013.01); *Y02B 70/126* (2013.01)
USPC .............. 323/271; 323/282; 363/89

(58) Field of Classification Search
CPC ......... H02M 3/156; H02M 3/158; G05F 1/10; G05F 1/46
USPC ..................... 323/271, 282; 363/89
See application file for complete search history.

(56) References Cited

U.S. PATENT DOCUMENTS

| | | | |
|---|---|---|---|
| 5,734,562 A | 3/1998 | Redl | |
| 5,814,976 A | 9/1998 | Allison | |
| 6,348,781 B1 | 2/2002 | Midya et al. | |
| 6,388,429 B1 | 5/2002 | Mao | |
| 6,909,622 B2 | 6/2005 | Weng | |
| 2004/0079953 A1 | 4/2004 | Mednik et al. | |
| 2004/0085788 A1 | 5/2004 | Weng | |
| 2008/0278092 A1 | 11/2008 | Lys et al. | |
| 2009/0290384 A1 | 11/2009 | Jungreis | |
| 2010/0244789 A1* | 9/2010 | Osaka | 323/271 |
| 2011/0089913 A1 | 4/2011 | Li et al. | |
| 2013/0082666 A1* | 4/2013 | Tsai et al. | 323/207 |
| 2013/0328536 A1* | 12/2013 | Ueno et al. | 323/271 |
| 2014/0021930 A1* | 1/2014 | Liu et al. | 323/271 |

FOREIGN PATENT DOCUMENTS

| | | |
|---|---|---|
| CN | 2560158 Y | 7/2003 |
| CN | 2562488 Y | 7/2003 |
| CN | 101282083 | 10/2008 |
| CN | 101351949 A | 1/2009 |
| CN | 101501603 A | 8/2009 |
| CN | 101572500 A | 11/2009 |

(Continued)

OTHER PUBLICATIONS

Taiwan Patent Office, Notice of Allowance issued on Apr. 1, 2014, Taiwan.

(Continued)

*Primary Examiner* — Jeffrey Sterrett
(74) *Attorney, Agent, or Firm* — Rabin & Berdo, P.C.

(57) ABSTRACT

The invention disclosed buck power factor correction system. The system includes: a first storing device, for storing and discharging energy; a first converter device, coupled to the first storing device, for transferring and converting energy; a second storing device, coupled to the first storing device, for storing and discharging energy; and a second converter device, coupled to the second storing device, for transferring and converting energy.

18 Claims, 14 Drawing Sheets

(56) References Cited

FOREIGN PATENT DOCUMENTS

| | | | |
|---|---|---|---|
| CN | 101594053 A | 12/2009 | |
| CN | 101789683 A | 7/2010 | |
| CN | 101834539 A | 9/2010 | |
| CN | 101931320 A | 12/2010 | |
| EP | 1992849 A1 | 11/2008 | |
| TW | 200531599 | 9/2005 | |
| TW | 201015816 A | 4/2010 | |
| TW | 201032435 A | 9/2010 | |
| TW | 201037952 | 10/2010 | |
| TW | 201115891 A | 5/2011 | |

OTHER PUBLICATIONS

LM5118 Wide Voltage Range Buck-Boost Controller, National Semiconductor, Apr. 30, 2008.

12 W PAR38 Buck LED Driver Using LNK405EG, Power Integrations, Jun. 9, 2010.

Wang et al., A Novel Bridgeless Buck-Boost PFC Converter; IEEE 2008, pp. 1304-1308.

Ridley et al., Analysis and Design of a Wide Input Range Power Factor Correction Circuit for Three-Phase Applications, 1993 IEEE; pp. 299-305.

Keogh et al., Design considerations for high efficiency Buck PFC with Half-Bridge regulation stage, 2010 IEEE, pp. 1384-1391.

Ghanem et al., Unity Power Factor Scheme Using Cascade Converters; 1993 IEEE, pp. 936-941.

Covi et al, A combined buck and boost converter for single-pheasc power-factor corretion, 2005 IBM Power and Cooling Technology Symposium; Oct. 7, 2005.

Lee, Buck-mode switching to improve the conversion efficiency, DianYuan.com, Jul. 10, 2010, Shanghai.

China Patent Office, Office Action issued on Jul. 15, 2014, China.

* cited by examiner

BUCK POWER FACTOR CORRECTION SYSTEM

TECHNICAL FIELD

The present invention relates to a buck power factor correction system, and more particularly to a buck power factor correction system capable of reducing reactive power of an electronic system for providing an effect of power factor correction.

TECHNICAL BACKGROUND

A great number of current electrical appliances operate on direct current, and thus need direct-alternating current conversion since public electricity is alternating current. To reduce reactive power of an electronic system as well as to minimize current harmonics that cause system interference, a power factor corrector is prevailingly implemented in many electrical appliances that are required to have a high power factor and low current harmonics. A common power factor correction circuit stereotypically adopts a boost approach, which is however set back by a limitation that a direct-current output voltage is necessarily higher than a peak value of an alternating-current input voltage. Further, although other circuits capable of outputting a lower voltage by means of buck or buck-boost are available, these circuits suffer from drawbacks from having less satisfactory characteristics and efficiency, a large volume for a corresponding storage component, complex control means to low feasibilities.

FIG. 1A shows a boost converter circuit frequently adopted by a conventional power factor corrector, which is advantaged by having a higher power factor and simpler control means. FIG. 1B shows a schematic diagram of waveforms of an input voltage $V_s$ and a current $I_s$ of the conventional power factor corrector in FIG. 1A, where ω is an angular frequency of public electricity, and $V_m$ and $I_m$ respectively represent a voltage peak and a current peak. A current path of the boost converter circuit allows partial energy from a power source AC to directly charge a direct-current link capacitor $C_{DC}$ (as shown by a solid-line arrow in FIG. 1A). Therefore, an energy-storing inductor in the boost converter circuit only needs to store relatively lower energy, so that it has not only a smaller volume but also high efficiency. $Q_{PFC}$ in FIG. 1A represents an active switch transistor, $D_{PFC}$ represents a diode, and a capacitor $C_s$ may be designed based on actual requirements. However, accompanied with a high output voltage, power components of the above conventional power factor corrector are often encountered with a higher voltage stress. In addition, for a load with a lower voltage requirement (lower than a peak voltage of the power source), the conventional boost power factor corrector, instead of directly providing an appropriate power source, is only able to provide a rated voltage needed by the load after stepping down its output voltage via a buck converter circuit, as shown in FIG. 2. Yet, the above design increases a circuit size and production costs as well as circuit power consumption, such that conversion efficiency of an overall circuit is reduced as a result.

To optimize conversion efficiency of a circuit, a power factor corrector with a design of a buck converter circuit has also been proposed, as shown in FIG. 3A. A current path of a buck converter circuit also allows partial energy from the power source AC to directly charge the direct-current link capacitor $C_{DC}$. Therefore, the energy-storing inductor in the buck converter circuit only needs to store relatively lower energy, so that it has not only a smaller volume but also high efficiency. A main shortcoming of the buck power factor corrector is that, when a power source voltage is lower than a direct-current output voltage, the circuit fails to induce an input current such that the input current becomes discontinuous, as shown in FIG. 3B. As a result, the buck power factor corrector has a lower power factor and larger current harmonics. In addition, the buck power factor corrector is further compromised by more complex control means.

There is also a buck-boost converter circuit (as shown in FIG. 4) or a fly-back converter circuit (as shown in FIG. 5) for serving as a power factor corrector. The two types of converter circuits above although indeed achieve a better power factor, due to the fact that the current path in converter circuits does not allow energy from the power source to directly charge the direct-current link capacitor, they are both disadvantaged by having a larger storage requirement for the inductor, a larger volume and poorer efficiency caused by magnetic energy loss.

There is yet another power factor corrector formed by integrating a boost converter circuit and a buck converter circuit, as shown in FIG. 6. An active switch transistor Q1 performs buck conversion when an active switch transistor Q2 is off; the active switch transistor Q2 performs boost conversion when the active switch transistor Q1 is off. However, unless being implemented in a customized integrated for a specific use, such design is extreme complex and is rather highly unfeasible and unpractical.

All the abovementioned conventional power factor correctors are disfavored by one common disadvantage—a large energy-storing capacitor $C_{DC}$ is required. To maintain a stable voltage at a load, an extremely small voltage change $\Delta V$ of the capacitor $C_{DC}$ is needed, which means that it is necessary that the capacitor $C_{DC}$ have sufficient capacitance for absorbing double-fold frequency power wave induced by the public electricity, as shown in FIG. 7. Limited by the extremely small voltage change $\Delta V$ for absorbing a difference between an input power and an output power, a capacitance of the direct-link capacitor needs to be very large.

TECHNICAL SUMMARY

A buck power factor correction system is provided according to an embodiment of the present invention. The buck power factor correction system comprises: a first storing device, for storing and discharging energy; a first converter device, coupled to the first storing device, for transferring and converter energy; a second storing device, coupled to the first storing device, for storing and discharging energy; and a second converter device, coupled to the second storing device, for transferring and converting energy. The buck power factor correction system further comprises: a rectifying device, coupled to the first storing device, receives and rectifies a power source to generate an input voltage; and a load, coupled to the first storing device. Preferably, the buck power factor correction system further comprises a switch element coupled between the first storing device and the second storing device.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION OF THE PREFERRED EMBODIMENT

Details of structures and concepts of the present invention shall be illustrated with embodiments below to give a better understanding on characteristics, objects and functions of the present invention.

Figure 1A:
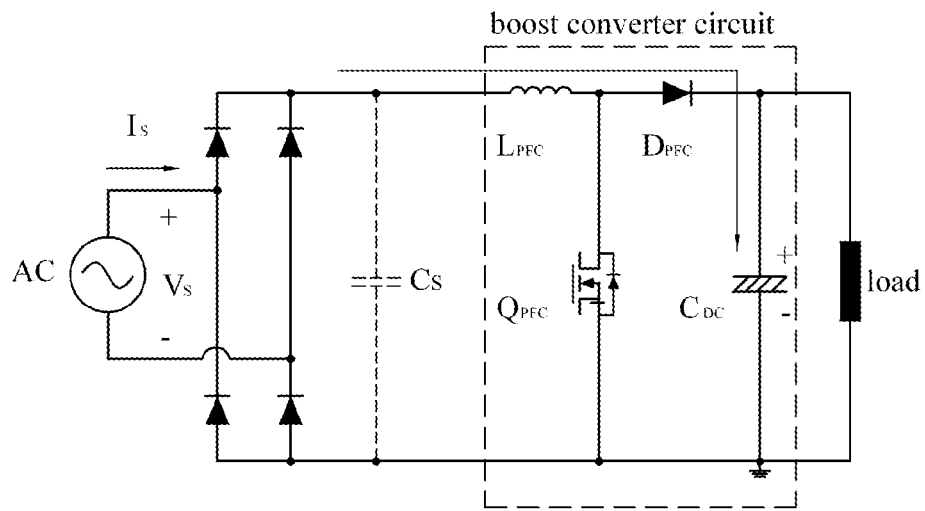
FIG. 1A is a boost converter circuit generally adopted in a conventional power factor corrector.
Figure 1B:
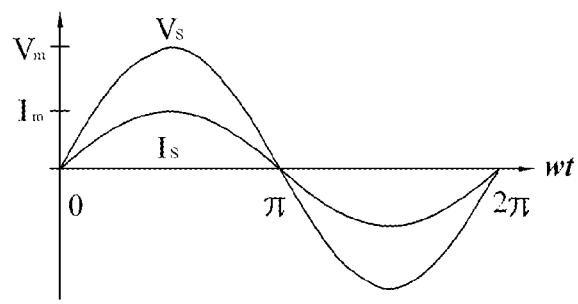
FIG. 1B is a schematic diagram of waveforms of an input voltage Vs and a current Is of the conventional power factor corrector in FIG. 1A.
Figure 2:
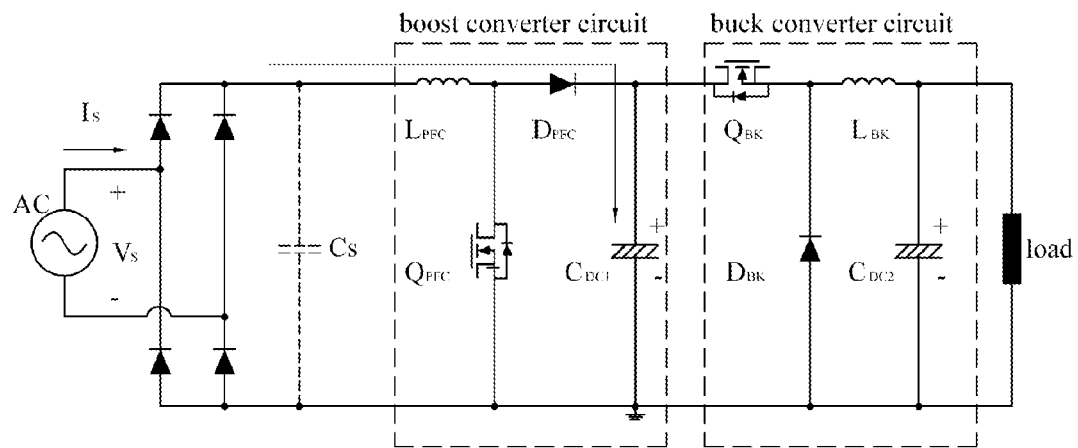
FIG. 2 is a conventional power factor corrector comprising a two-order boost and buck converter circuits.
Figure 3A:
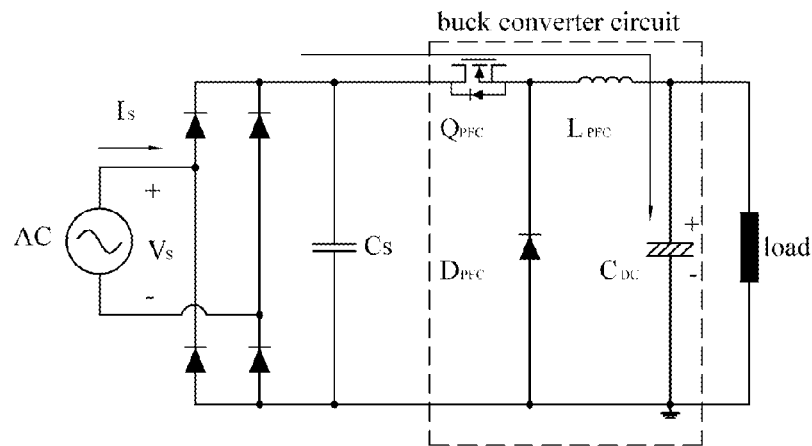
FIG. 3A is a conventional buck power factor corrector.
Figure 3B:
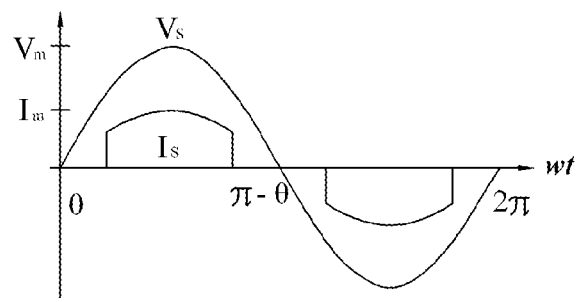
FIG. 3B is a schematic diagram of waveforms of an input voltage Vs and a current Is of the conventional power factor corrector in FIG. 3A.
Figure 4:
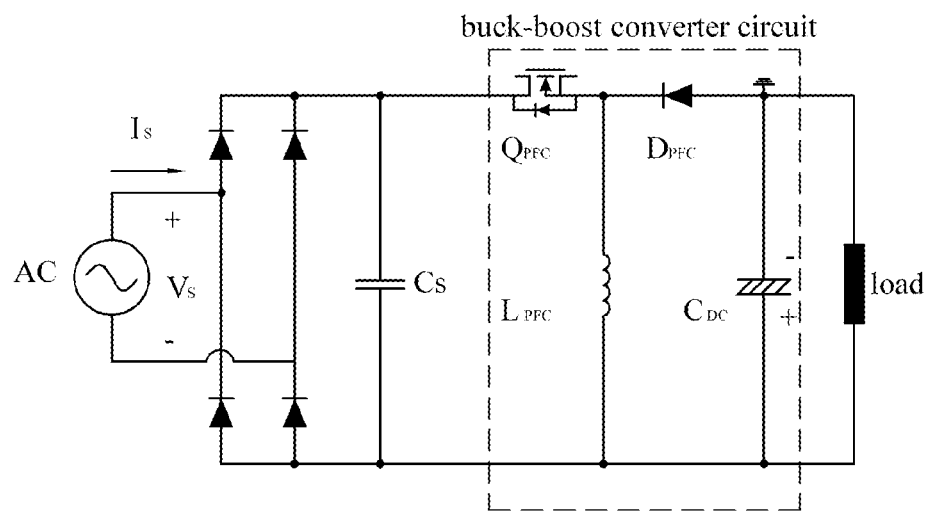
FIG. 4 is a conventional power factor corrector comprising a buck-boost converter circuit.
Figure 5:
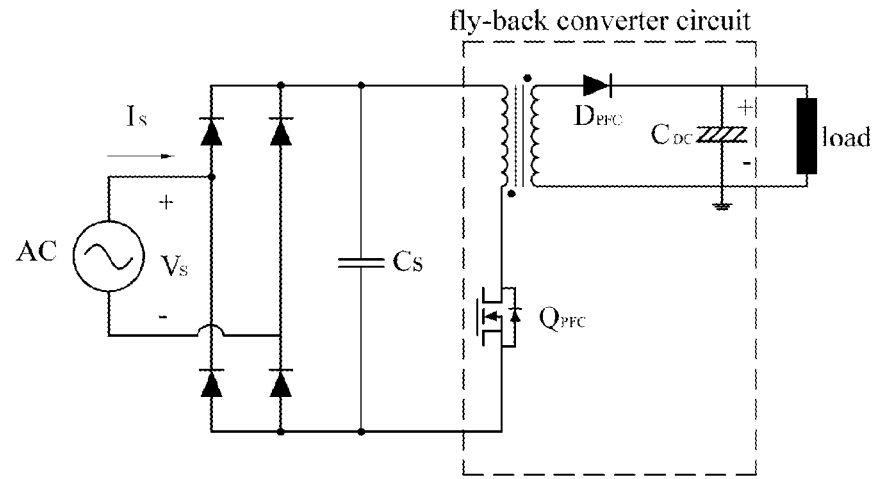
FIG. 5 is a conventional power factor corrector comprising a fly-back converter circuit.
Figure 6:
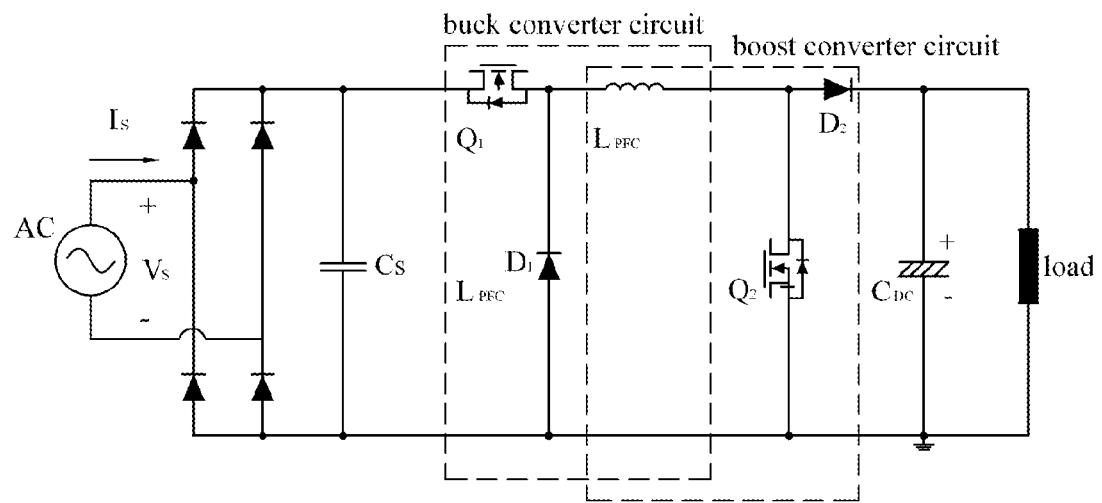
FIG. 6 is a power factor corrector integrating a boost and buck converter circuits.
Figure 7:
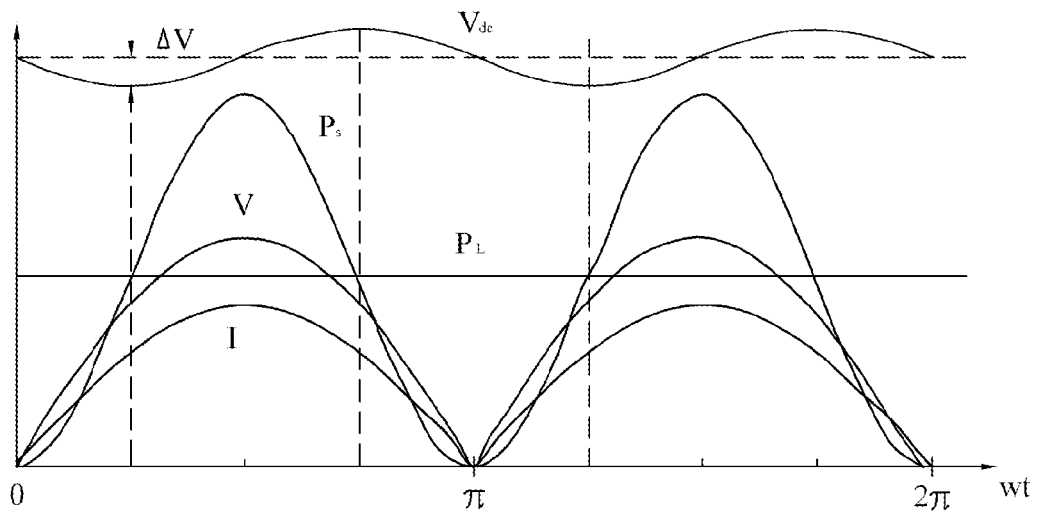
FIG. 7 is a waveform diagram illustrating relations of power wave and a voltage change $\Delta V$ of an energy-storing capacitor $C_{DC}$.
Figure 8:
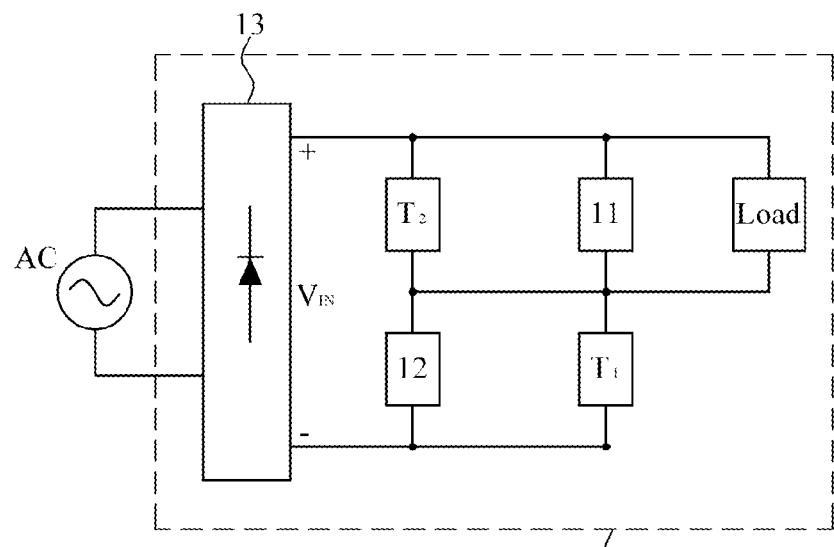
FIG. 8 is a buck power factor correction system according to an embodiment of the present invention.

Refer to FIG. 8 showing a buck power factor correction system 1 according to an embodiment of the present invention. The buck power factor correction system 1 comprises: a first storing device 11, a first converter device $T_1$, a second storing device 12, and a second converter device $T_2$. The first storing device 11 is for storing and discharging energy. The first converter device $T_1$ is coupled to the first storing device 11 is for transferring and converting energy. The second storing device 12 is coupled to the first storing device 11 is for storing and discharging energy. The second converter device $T_2$ is coupled to the second storing device 12 is for transferring and converting energy. The buck power factor correction system 1 further comprises a rectifying device 13 and a load. The rectifying device 13 is coupled to the first storing device 11 is for receives and rectifies a power source AC (e.g., an alternating current) to generate an input voltage $V_{IN}$. The load is coupled to the first storing device 11.

Figure 9A:
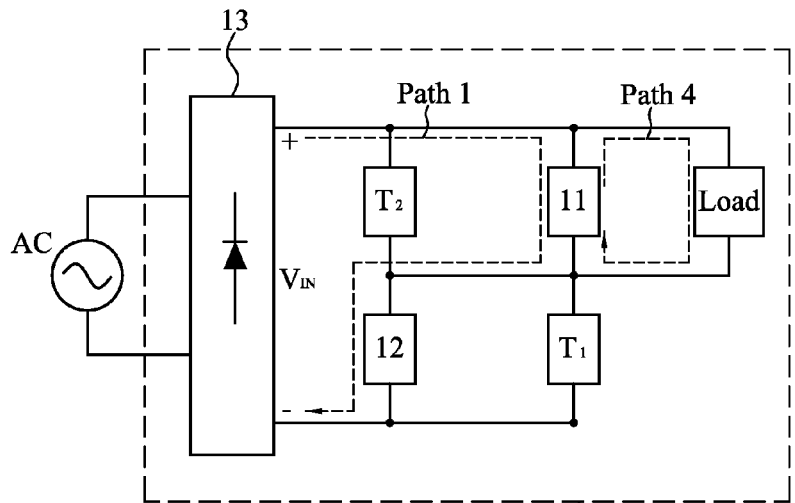
FIGS. 9(A), 9(B) and 9(C) are a plurality of energy-transferring paths of the buck power factor correction system in FIG. 8.
Figure 9B:
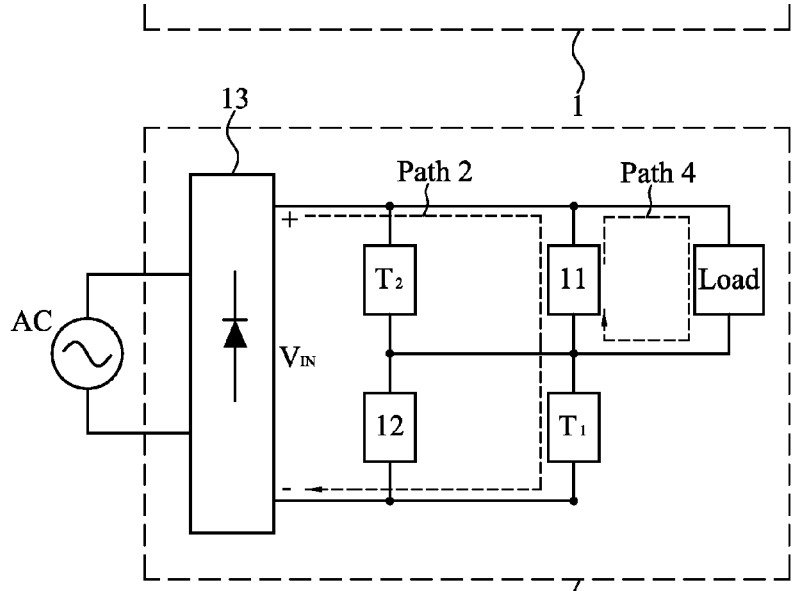
Figure 9C:
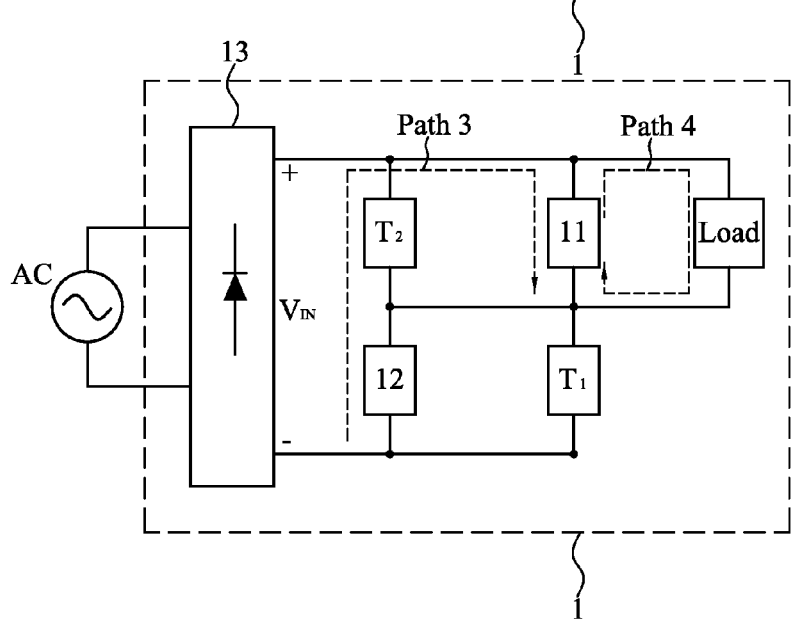

Energy-storing paths of the first storing device 11 comprises: Path 1, for directly charging the first and second storing devices 11 and 12 by the input voltage $V_{IN}$ to form a first energy-transferring path, as shown in FIG. 9(A); a Path 2, for charging the first storing device 11 via the first converter device $T_1$ by the input voltage $V_{IN}$ to form a second energy-transferring path, as shown in FIG. 9(B); and a Path 3, for charging the first storing device 11 via the second converter device $T_2$ by the second storing device 12 to form a third energy-transferring path, as shown in FIG. 9(C).

The first converter device $T_1$ and the second converter device $T_2$ perform energy conversion according to a timing control, so that the energy-storing paths Path 1, Path 2 and Path 3 sequentially become effective. The energy needed by the load is supplied by the first storing device 11, and has a corresponding energy-transferring path of Path 4.

Figure 10:
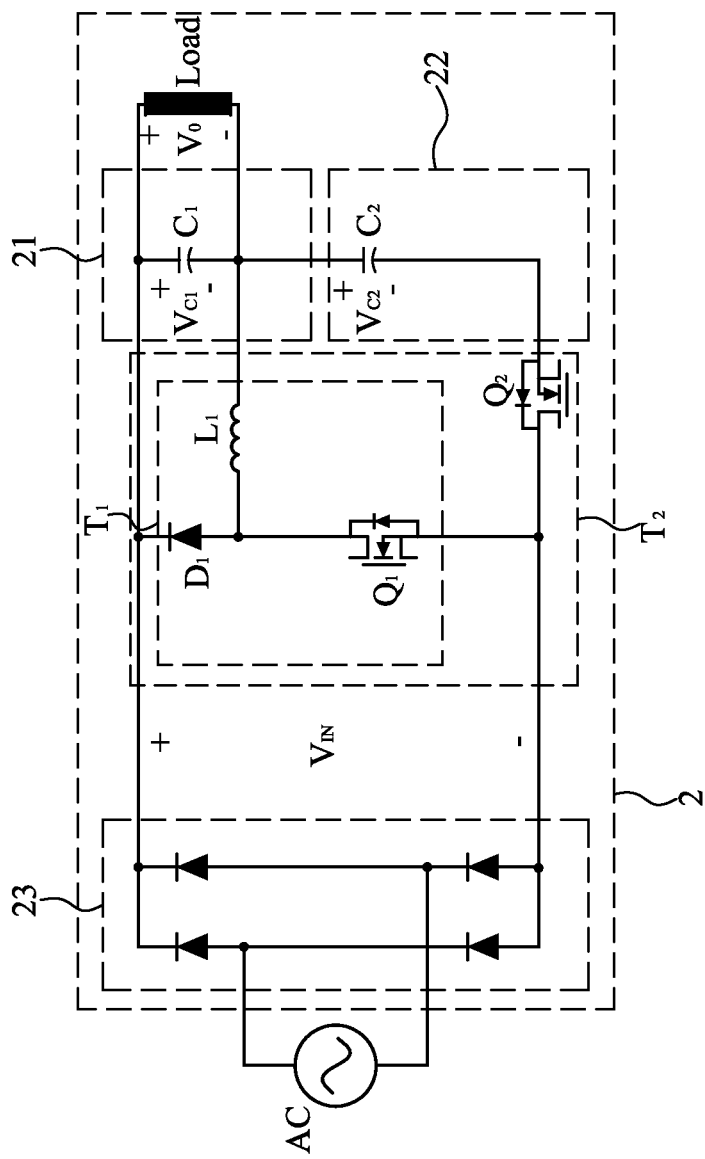
FIG. 10 is an embodiment applying the structure shown in FIG. 8.

FIG. 10 shows an embodiment applying the structure shown in FIG. 8. A buck power factor correction system 2 comprises: a first storing device 21, a second storing device 22, a first converter device $T_1$ and a second active switch transistor $Q_2$. In practice, the first converter device $T_1$ may be combined with the second active switch transistor $Q_2$ to form a second converter device $T_2$. The buck power factor correction system 2 further comprises a rectifying device 23 and a load. The rectifying device 23 receives and rectifies a power source AC (e.g., an alternating current) to generate an input voltage $V_{IN}$. In this embodiment, the first and second storing devices 21 and 22 may respectively be capacitors $C_1$ and $C_2$, the rectifying device 23 may be a bridge rectifier. The first converter device $T_1$ comprises a first diode $D_1$, a first active transistor $Q_1$ and a first inductor $L_1$; the second converter device $T_2$ comprises the first diode $D_1$, the first active switch transistor $Q_1$, the first inductor L1 and the second active switch transistor $Q_2$. Further, the first diode $D_1$ in the first converter device $T_1$ has its one end coupled to the rectifying device 23 and its other end coupled to the first active switch transistor $Q_1$ and the first inductor $L_1$. The first active switch transistor $Q_1$ has its one end coupled to the first diode $D_1$ and its other end coupled to the rectifying device 23. The first inductor $L_1$ has its one end coupled to the first diode $D_1$ and its other end coupled to the first storing device 21 (the capacitor $C_1$). The second active switch transistor $Q_2$ in the second converter device $T_2$ has its one end coupled to the first active switch transistor $Q_1$ and its other end coupled to the second storing device 22 (the capacitor $C_2$). The first storing device 21 (the capacitor $C_1$) has its one end coupled to the first diode $D_1$ and its other end coupled to the second storing device 22 (the capacitor $C_2$), and is connected in parallel with the load. The second storing device 22 (the capacitor $C_2$) has its one end coupled to the capacitor $C_1$ and its other end coupled to the second active switch transistor $Q_2$. The second active switch transistor $Q_2$ is responsible for low-frequency switching; the first active switch transistor $Q_1$ is controlled by a high-frequency pulse-width modulation (PWM) signal that modulates the pulse width through a feedback signal. Circuit operations of the buck power factor correction system 2 shall be described below.

Figure 11A:
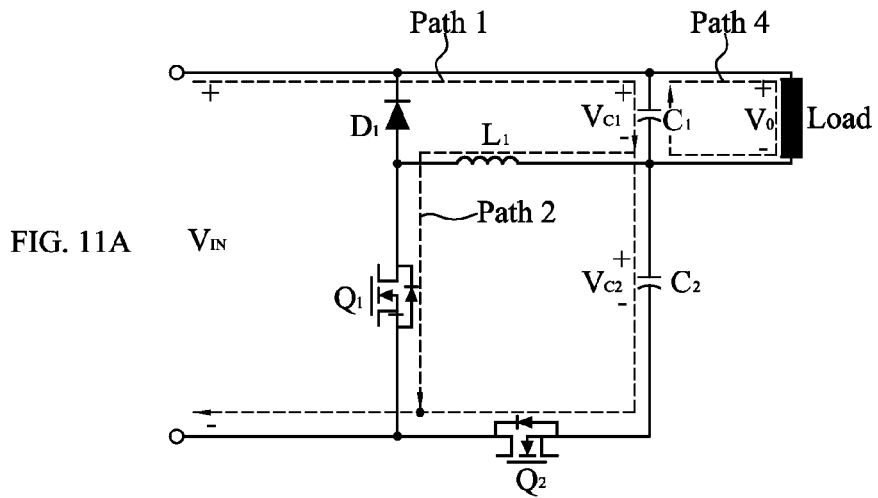
FIGS. 11(A), 11(B) and 11(C) illustrate circuit operations of the buck power factor correction system in FIG. 10 when an input voltage is greater than a voltage sum of first and second storing devices.

A mode 1 shall be first discussed below. In this embodiment, when the input voltage $V_{IN}$ is greater than a voltage sum $V_{C1}+V_{C2}$ of the first and second storing devices 21 and 22, a bypass diode on the second active switch transistor $Q_2$ is forward biased, so that the input voltage $V_{IN}$ directly charges the first and second storing devices 21 and 22 to form a first energy-transferring path Path 1. Meanwhile, the input voltage $V_{IN}$ charges the first storing device 21 via the first transferring device $T_1$ to form a second energy-transferring path Path 2. A fourth path Path 4 is also formed between the first storing device 21 and the load, which has a cross voltage $V_O$. Under this mode, the second converter device $T_2$ is non-operating, and so a third energy-transferring path Path 3 is non-existent. The first energy-transferring path Path 1 is formed from the input voltage $V_{IN}$ via the first and second storing devices 21 and 22 (the capacitors $C_1$ and $C_2$) and the bypass diode connected to the second active switch transistor $Q_2$. The second energy-transferring path Path 2 is formed from the input voltage $V_{IN}$ via the first storing device 21 (the capacitors $C_1$) and the first converter device $T_1$. The fourth energy-transferring path Path 4 is formed by a loop between the first storing device 21 (the capacitors $C_1$) and the load. Operation details of the circuit above are as depicted in FIG. 11(A).

Figure 11B:
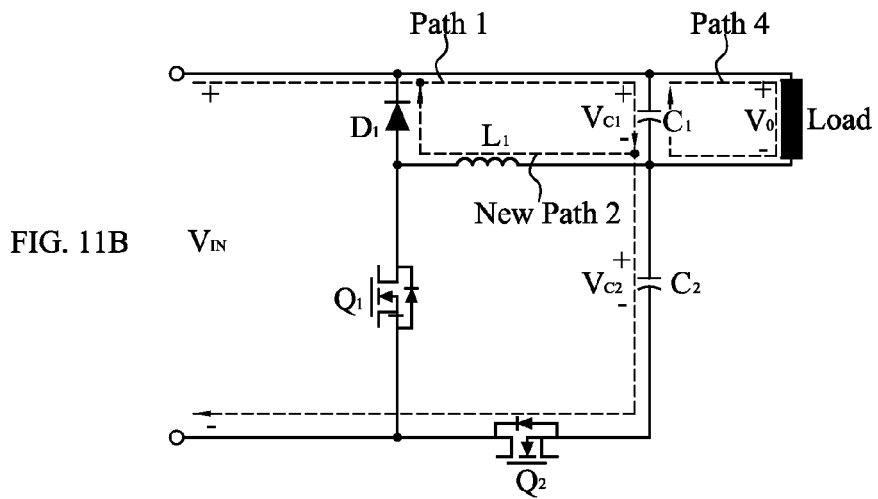

Under the mode 1, when the first active switch transistor $Q_1$ in the first converter device $T_1$ is turned on by high-frequency PWM and the first diode $D_1$ is off, a second energy-transferring path Path 2 is formed. The second energy-transferring path Path 2 is formed by a loop of the input voltage $V_{IN}$, the first storing device 21 (the capacitor $C_1$), the first inductor $L_1$ and the first active switch transistor $Q_1$, as shown in FIG. 11(A). The input voltage $V_{IN}$ charges the first energy-storing capacitor $C_1$ and the first inductor $L_1$ at this point. When the high-frequency PWM at the first active switch transistor $Q_1$ is turned off, the first diode $D_1$ in the first converter device $T_1$ becomes turned on to form a new second energy-transferring path New Path 2, which is formed by a loop of the first energy-storing capacitor $C_1$, the first inductor $L_1$ and the first diode $D_1$. Further, the energy in the first inductor $L_1$ is discharged to the first energy-storing capacitor $C_1$ via the newly formed path New Path 2, as shown in FIG. 11(B). Meanwhile, the bypass diode on the second active switch transistor $Q_2$ remains turned on under this mode, so that the energy-transferring paths Path 1 and Path 4 stay unchanged.

Figure 11C:
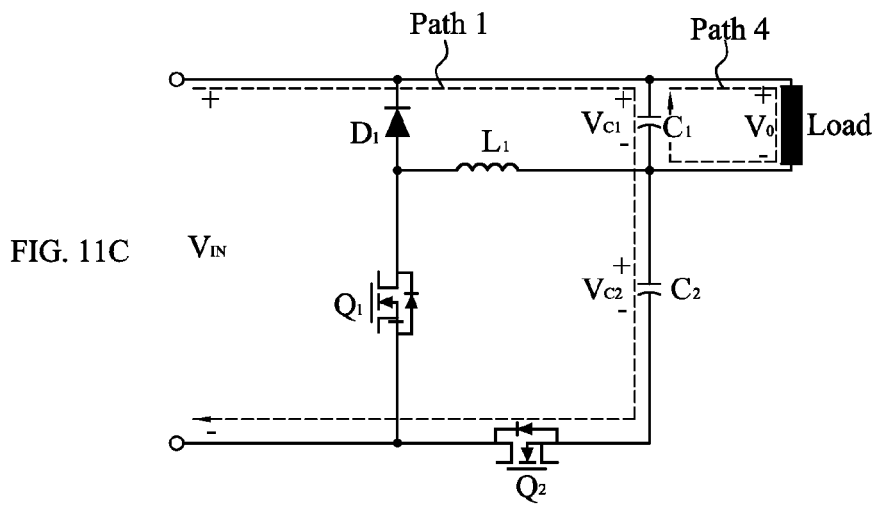

Referring to FIG. 11(C), when the energy in the first inductor $L_1$ is completely discharged to the first energy-storing capacitor $C_1$ via the new second energy-transferring path New Path 2, the first diode $D_1$ and the first active switch transistor $Q_1$ become turned off such that the newly formed second energy-transferring path New Path 2 disappears, while the first and fourth energy-transferring paths Path 1 and 4 remain unchanged—such stage only takes place when the current of the first inductor $L_1$ is discontinuous. When the first active switch transistor $Q_1$ is again turned on by high-frequency PWM, the second energy-transferring path Path 2 is again formed to thus operate cyclically.

Figure 12A:
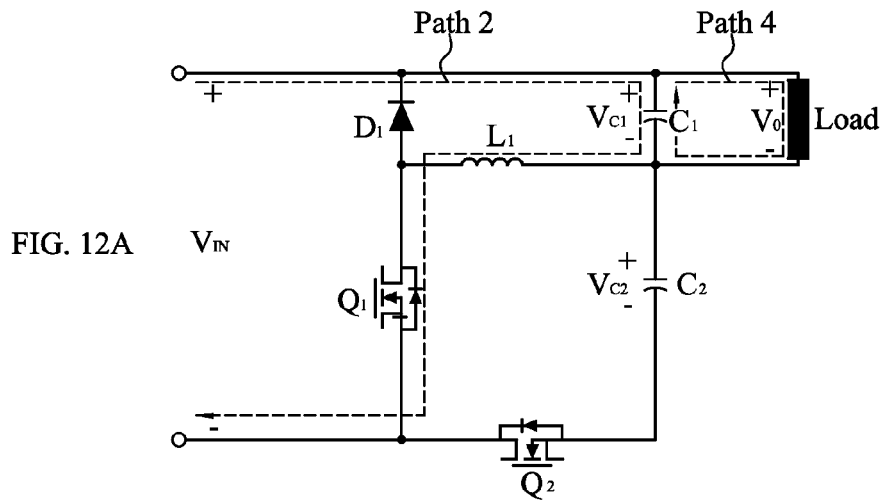
FIGS. 12(A), 12(B) and 12(C) illustrate circuit operations of the buck power factor correction system in FIG. 10 when an input voltage is smaller than a voltage sum of first and second storing devices but greater than a voltage of the first storing device.

A mode 2 shall be discussed. In this embodiment, when the input voltage $V_{IN}$ is smaller than a voltage sum $V_{C1}+V_{C2}$ of the first and second storing devices 21 and 22, but greater than the voltage $V_{C1}$ of the first energy-storing capacitor $C_1$, the second active switch transistor $Q_2$ is off, the first energy-transferring path Path 1 is non-existent and the second storing device 22 (the capacitor $C_2$) is no longer charged; the second converter device $T_2$ is non-operating, i.e., the third energy-transferring path Path 3 is non-existent. At this point, the input voltage $V_{IN}$ charges the first storing device 21 (the capacitor $C_1$) via the first converter device $T_1$ to form a second energy-transferring path Path 2. Further, a fourth energy-transferring path Path 4 is formed between the first storing device 21 (the capacitor $C_1$) and the load, as shown in FIG. 12(A). Thus, the second energy-transferring path Path 2 is formed from the input voltage $V_{IN}$ via the first storing device 21 (the capacitor $C_1$) and the first converter device $T_1$, and the fourth energy-transferring path Path 4 is formed by a loop between the first storing device 21 (the capacitor $C_1$) and the load.

Figure 12B:
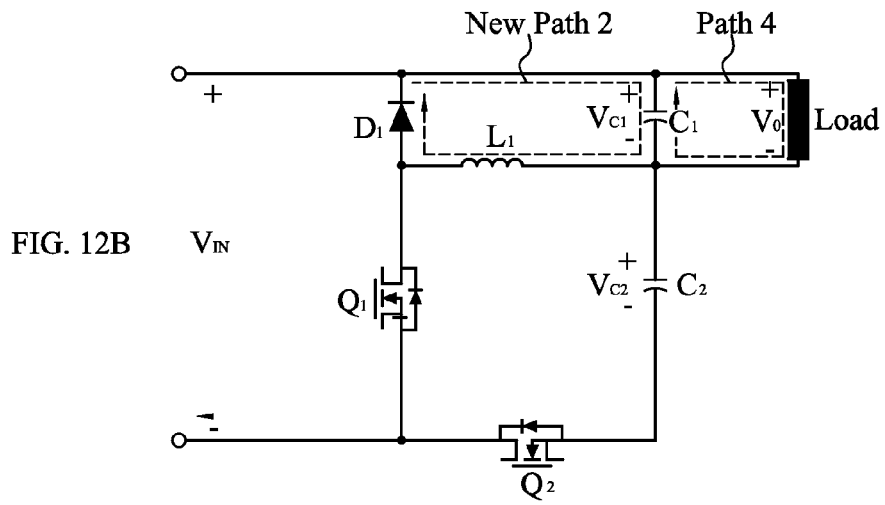

Under the mode 2, when the first active switch transistor $Q_1$ in the first converter device $T_1$ is turned on by high-frequency PWM and the first diode $D_1$ is off, a second energy-transferring path Path 2 is formed. The second energy-transferring path Path 2 is formed by a loop of the input voltage $V_{IN}$, the first storing device 21 (the capacitor $C_1$), the first inductor $L_1$ and the first active switch transistor $Q_1$. At this point, the input voltage $V_{IN}$ charges the first energy-storing capacitor $C_1$ and the first inductor $L_1$. When the high-frequency PWM at the first active switch transistor $Q_1$ is turned off, the first diode $D_1$ in the first converter device $T_1$ becomes turned on to form a new second energy-transferring path New Path 2, which is formed by a loop of the first energy-storing capacitor $C_1$, the first inductor $L_1$ and the first diode $D_1$. Further, the energy in the first inductor $L_1$ is discharged to the first energy-storing capacitor $C_1$ via the newly formed path New Path 2, as shown in FIG. 12(B).

Figure 12C:
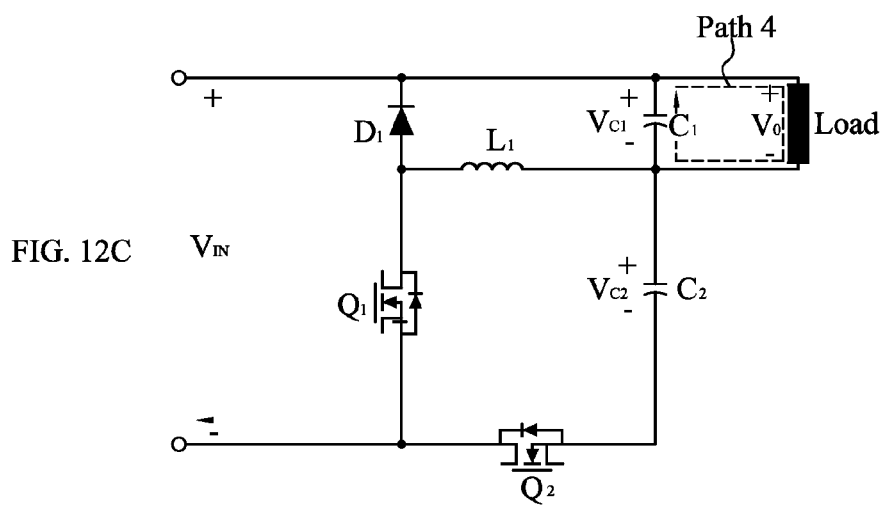

Referring to FIG. 12(C), when the energy in the first inductor $L_1$ is completely discharged to the first energy-storing capacitor $C_1$ via the new second energy-transferring path New Path 2, the first diode $D_1$ and the first active switch transistor $Q_1$ in the first converter device $T_1$ become turned off such that the newly formed second energy-transferring path New Path 2 disappears, while the fourth energy-transferring paths Path 4 remains unchanged—such stage only takes place when the current of the first inductor $L_1$ is discontinuous. When the first active switch transistor $Q_1$ is again turned on by high-frequency PWM, the second energy-transferring path Path 2 is again formed to thus operate cyclically.

Figure 13A:
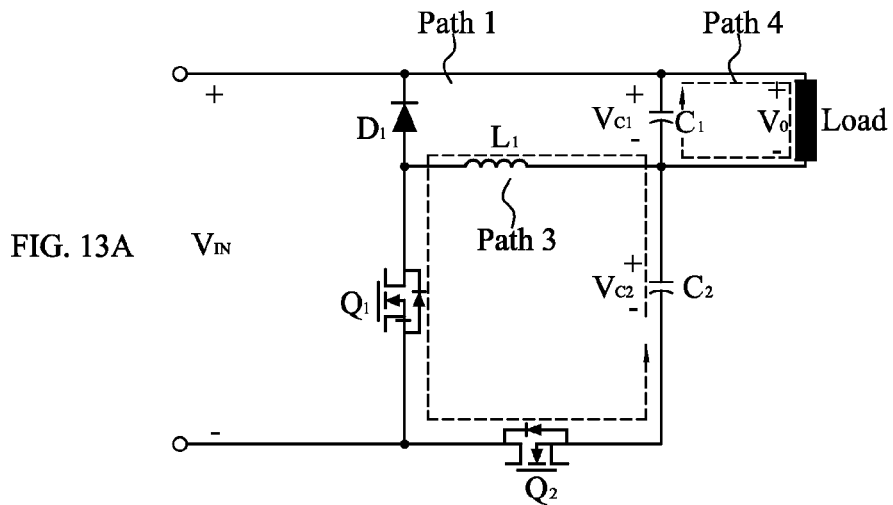
FIGS. 13(A), 13(B) and 13(C) illustrate circuit operations of the buck power factor correction system in FIG. 10 when an input voltage is smaller than a voltage of the first storing device.

Next, a mode 3 shall be discussed. In this embodiment, when the input voltage $V_{IN}$ is smaller than the voltage $V_{C1}$ of the first storing device 21 (the capacitor $C_1$), the second active switch transistor Q2 is turned on to activate the second converter device $T_2$, so as to form a third energy-transferring path Path 3. The third energy-transferring path Path 3 is formed by the second storing device 22 (the capacitor $C_2$) and the second converter device $T_2$. A fourth energy-transferring path Path 4 is also formed between the first storing device 21 (the capacitor $C_1$) and the load. Under this mode, the first energy-transferring path Path 1 and the second energy-transferring path Path 2 are non-existent. Further, the fourth energy-transferring path Path 4 is formed by a loop between the first storing device 21 (the capacitor $C_1$) and the load, as shown in FIG. 13(A).

Figure 13B:
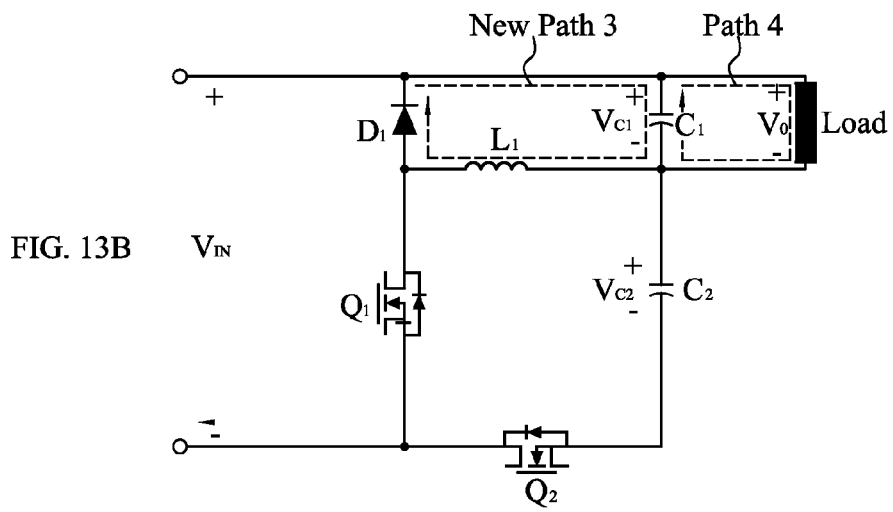

Under the mode 3, when the first active switch transistor $Q_1$ in the second converter device $T_2$ is turned on by the high-frequency PWM and the first diode $D_1$ is off, a third energy-transferring path Path 3 is formed. The third energy-transferring path Path 3 is formed by a loop of the first inductor $L_1$, the first active switch transistor $Q_1$, the second active switch transistor $Q_2$ and the second storing device 22 (the capacitor $C_2$). At this point, the second energy-storing capacitor $C_2$ charges the first inductor $L_1$. Referring to FIG. 13(B), when the high-frequency PWM at the first active switch transistor $Q_1$ is turned off, the first diode $D_1$ in the second converter device $T_2$ becomes turned on to form a new third energy-transferring path New Path 3, which is formed by a loop of the first storing device 21 (the capacitor $C_1$), the first inductor $L_1$ and the first diode $D_1$. Further, the energy in the first inductor $L_1$ is discharged to the first energy-storing capacitor $C_1$ via the newly formed path New Path 3.

Figure 13C:
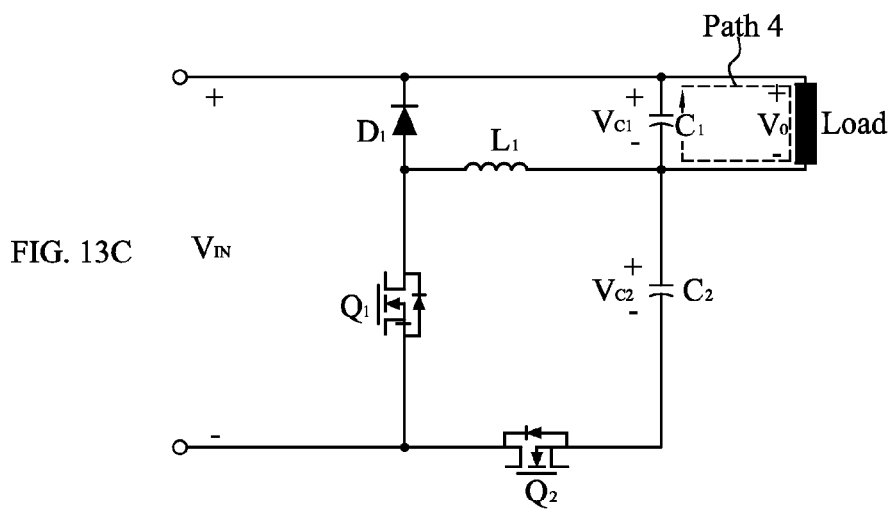

Referring to FIG. 13(C), when the energy in the first inductor $L_1$ is completely discharged to the first energy-storing capacitor $C_1$ via the new third energy-transferring path New Path 3, the first diode $D_1$ and the first active switch transistor $Q_1$ in the second converter device $T_2$ become turned off such that the newly formed third energy-transferring path New Path 3 disappears, while the fourth energy-transferring path Path 4 remains unchanged—such stage only takes place when the current of the first inductor $L_1$ is discontinuous. When the first active switch transistor $Q_1$ is again turned on by high-frequency PWM, the third energy-transferring path Path 3 is again formed to thus operate cyclically.

According to this embodiment, the first diode $D_1$, the first active switch transistor $Q_1$ and the first inductor $L_1$ compose the first converter device $T_1$. However, during circuit operations, the first diode $D_1$, the first active switch transistor $Q_1$, the first inductor $L_1$ and the second active switch transistor $Q_2$ may also compose the second converter device $T_2$.

Figure 14:
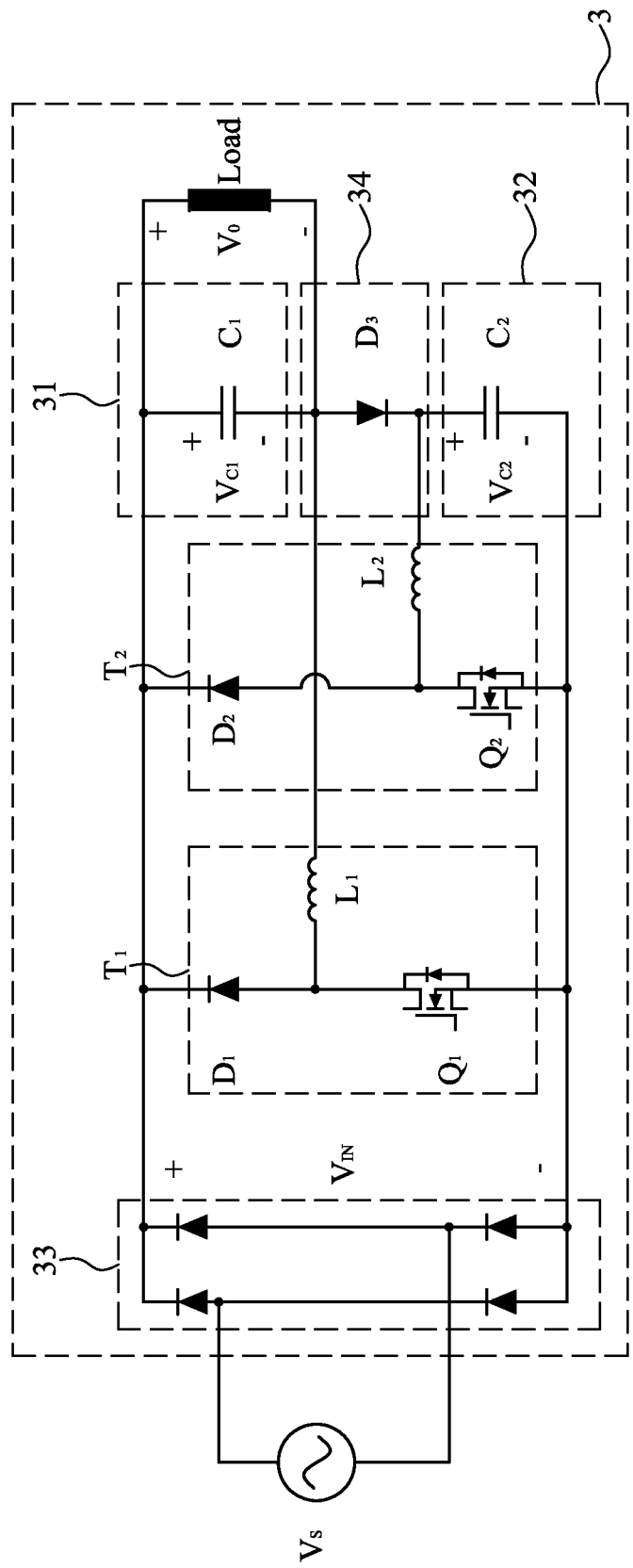
FIG. 14 is another embodiment applying the structure shown in FIG. 8.

FIG. 14 shows another embodiment applying the structure shown in FIG. 8. A buck power factor correction system 3 comprises a first storing device 31, a second storing device 32, a first converter device $T_1$ and a second converter device $T_2$. The buck power factor correction system 3 further comprises a rectifying device 33 and a load. The rectifying device 33 receives and rectifies a power source AC (e.g., an alternating current) to generate an input voltage $V_{IN}$. The buck power factor correction system 3 further comprises a switch element 34 coupled between the first storing device 31 and the second storing device 32. In this embodiment, the first and second storing devices 31 and 32 may be capacitors $C_1$ and $C_2$; the rectifying device 33 may be a bridge rectifier; the first converter device $T_1$ comprises a first diode $D_1$, a first active switch transistor $Q_1$ and a first inductor $L_1$; the second converter device $T_2$ comprises a second diode $D_2$, a second active switch transistor $Q_2$, a second inductor $L_2$; and the switch element 34 may be a diode $D_3$. Further, the first diode $D_1$ in the first converter device $T_1$ has its one end coupled to the rectifying device 33 and its other end coupled to the first active switch transistor $Q_1$ and the first inductor $L_1$. The first active switch transistor $Q_1$ in the first converter device $T_1$ has its one end coupled to the first diode $D_1$ and its other end coupled to the rectifying device 33. The first inductor $L_1$ in the first converter device $T_1$ has its one end coupled to the first diode $D_1$ and its other end coupled to the switch element 34. The second diode $D_2$ in the second converter device $T_2$ has its one end coupled to the first diode $D_1$ and the first storing device 31 (the capacitor $C_1$), and its other end coupled to the Second active switch transistor $Q_2$ and the Second inductor $L_2$. The second active switch transistor $Q_2$ in the second converter device $T_2$ has its one end coupled to the second diode $D_2$, and its other end to the first active switch transistor $Q_1$ and the second storing device 32. The second inductor $L_2$ in the second converter device $T_2$ has its one end coupled to the second diode $D_2$ and its other end to the switch element 34. The first storing device 31 (the capacitor $C_1$) has its one end coupled to the first diode $D_1$ and its other end to the switch element 34, and is connected in parallel with the load. The capacitor $C_2$ in the second storing device 32 has its one end coupled to the switch element 34 and its other end coupled to the second active switch transistor $Q_2$. The first and second active switch transistors $Q_1$ and $Q_2$ may be both controlled by a set or respectively controlled by two sets of a high-frequency pulse-width modulation (PWM) signals that perform modulation through a feedback signal. Circuit operations of the buck power factor correction system 3 shall be described below.

Figure 15A:
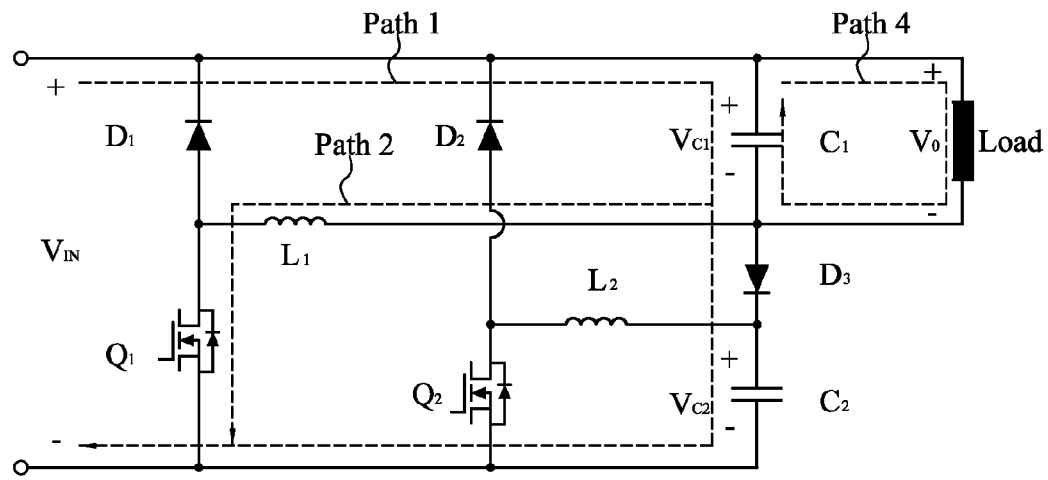
FIGS. 15(A), 15(B) and 15(C) illustrate circuit operations of the buck power factor correction system in FIG. 14 when an input voltage is greater than a voltage sum of first and second storing devices.

A mode 1 shall first be discussed below. In this embodiment, when the input voltage $V_{IN}$ is greater than a voltage sum $V_{C1}+V_{C2}$ of the first and second storing devices 31 and 32, the switch element 34 (the diode $D_3$) is forward biased, so that the input voltage $V_{IN}$ directly charges the first and second storing devices 31 and 32 to form a first energy-transferring path Path 1. Meanwhile, the input voltage $V_{IN}$ charges the first storing device 21 via the first transferring device $T_1$ to form a second energy-transferring path Path 2. A fourth path Path 4 is also formed between the first storing device 31 and the load, which has a cross voltage $V_O$. Under this mode, the second converter device $T_2$ is non-operating, and so a third energy-transferring path Path 3 is non-existent. Referring to FIG. 15(A), the first energy-transferring path Path 1 is formed from the input voltage $V_{IN}$ via the first and second storing devices 31 and 32 (the capacitors $C_1$ and $C_2$) and the switch element 34 (the diode $D_3$). The second energy-transferring path Path 2 is formed from the input voltage $V_{IN}$ via the first storing device 31 (the capacitors $C_1$) and the first converter device $T_1$. The fourth energy-transferring path Path 4 is formed by a loop between the first storing device 31 (the capacitors $C_1$) and the load.

Figure 15B:
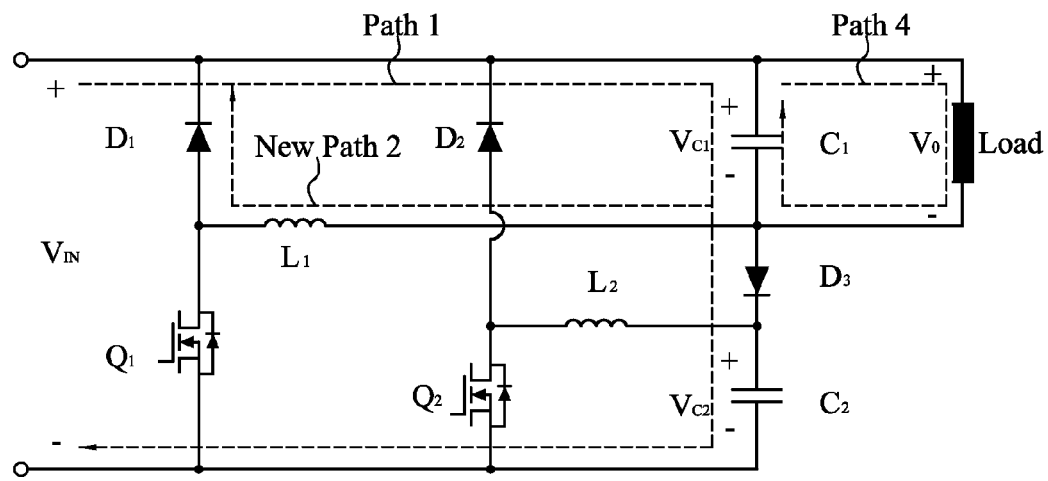

Under the mode 1, when the first active switch transistor $Q_1$ in the first converter device $T_1$ is turned on by high-frequency PWM and the first diode $D_1$ is off, a second energy-transferring path Path 2 is formed. The second energy-transferring path Path 2 is formed by a loop of the input voltage $V_{IN}$, the first storing device 31 (the capacitor $C_1$), the first inductor $L_1$ and the first active switch transistor $Q_1$. Referring to FIG. 15(A), the input voltage $V_{IN}$ charges the first energy-storing capacitor $C_1$ and the first inductor $L_1$ at this point. When the high-frequency PWM at the first active switch transistor $Q_1$ is turned off, the first diode $D_1$ in the first converter device $T_1$ becomes turned on to form a new second energy-transferring path New Path 2, which is formed by a loop of the first energy-storing capacitor device 31 (the capacitor $C_1$), the first inductor $L_1$ and the first diode $D_1$, as shown in FIG. 15(B). The energy in the first inductor $L_1$ is discharged to the first energy-storing capacitor $C_1$ via the newly formed path New Path 2. Meanwhile, the energy-transferring paths Path 1 and Path 4 stay unchanged.

Figure 15C:
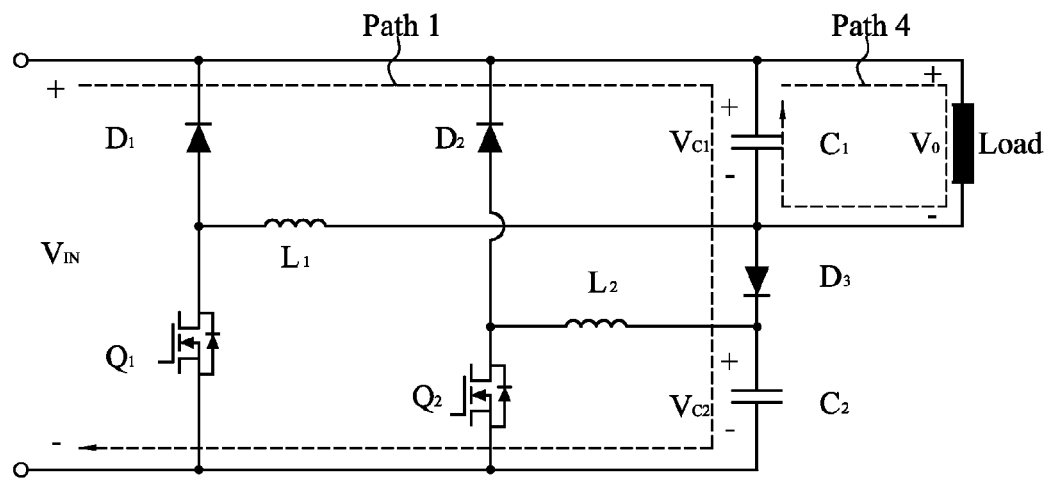

Referring to FIG. 15(C), when the energy in the first inductor $L_1$ is completely discharged to the first energy-storing capacitor $C_1$ via the new second energy-transferring path New Path 2, the first diode $D_1$ and the first active switch transistor $Q_1$ in the first converter device $T_1$ become turned off such that the newly formed second energy-transferring path New Path 2 disappears, while the first and fourth energy-transferring paths Path 1 and 4 remain unchanged—such stage only takes place when the current of the first inductor $L_1$ is discontinuous. When the first active switch transistor $Q_1$ is again turned on by high-frequency PWM, the second energy-transferring path Path 2 is again formed to thus operate cyclically.

Figure 16A:
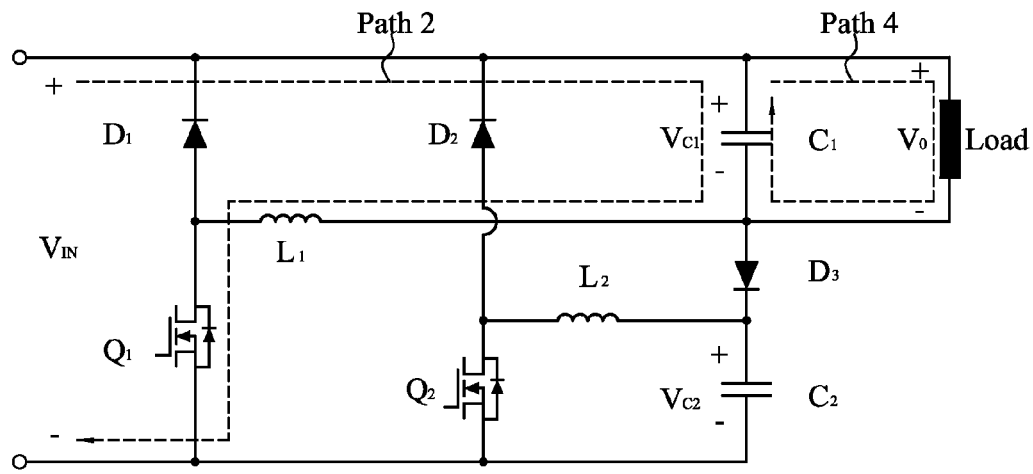
FIGS. 16(A), 16(B) and 16(C) illustrate circuit operations of the buck power factor correction system in FIG. 14 when an input voltage is smaller than a voltage sum of first and second storing devices but greater than a voltage of the first storing device.

A mode 2 shall be discussed. In this embodiment, when the input voltage $V_{IN}$ is smaller than a voltage sum $V_{C1}+V_{C2}$ of the first and second storing devices 31 and 32 but greater than the voltage $V_{C1}$ of the first energy-storing capacitor $C_1$, the switch element 34 (the diode $D_3$) is reverse biased, the first energy-transferring path Path 1 is non-existent and the second storing device 32 (the capacitor $C_2$) is no longer charged; the second converter device $T_2$ is non-operating, i.e., the third energy-transferring path Path 3 is non-existent. At this point, the input voltage $V_{IN}$ charges the first storing device 31 (the capacitor $C_1$) via the first converter device $T_1$ to form a second energy-transferring path Path 2. Further, a fourth energy-transferring path Path 4 is formed between the first storing device 31 (the capacitor $C_1$) and the load, as shown in FIG. 16(A). The second energy-transferring path Path 2 is formed from the input voltage $V_{IN}$ via the first storing device 31 (the capacitor $C_1$) and the first converter device $T_1$, and the fourth energy-transferring path Path 4 is formed by a loop between the first storing device 31 (the capacitor $C_1$) and the load.

Figure 16B:
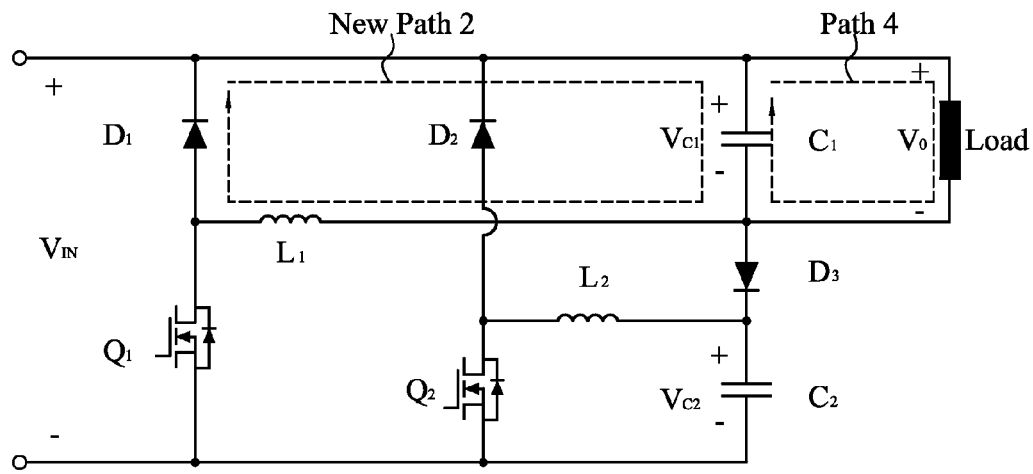

Under the mode 2, when the first active switch transistor $Q_1$ in the first converter device $T_1$ is turned on by high-frequency PWM and the first diode $D_1$ is off, a second energy-transferring path Path 2 is formed. The second energy-transferring path Path 2 is formed by a loop of the input voltage $V_{IN}$, the first storing device 31 (the capacitor $C_1$), the first inductor $L_1$ and the first active switch transistor $Q_1$. At this point, the input voltage $V_{IN}$ charges the first energy-storing capacitor $C_1$ and the first inductor $L_1$. When the high-frequency PWM at the first active switch transistor $Q_1$ is turned off, the first diode $D_1$ in the first converter device $T_1$ becomes turned on to form a new second energy-transferring path New Path 2, which is formed by a loop of the first energy-storing capacitor $C_1$, the first inductor $L_1$ and the first diode $D_1$. Further, the energy in the first inductor $L_1$ is discharged to the first energy-storing capacitor $C_1$ via the newly formed path New Path 2, as shown in FIG. 16(B).

Figure 16C:
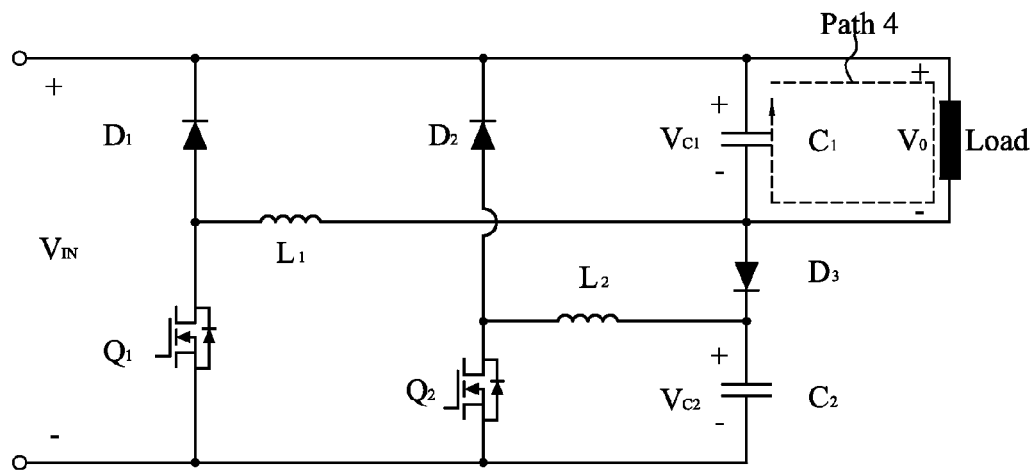

Referring to FIG. 16(C), when the energy in the first inductor $L_1$ is completely discharged to the first energy-storing capacitor $C_1$ via the new second energy-transferring path New Path 2, the first diode $D_1$ and the first active switch transistor $Q_1$ become turned off such that the newly formed second energy-transferring path New Path 2 disappears, while the fourth energy-transferring paths Path 4 remains unchanged—such stage only takes place when the current of the first inductor $L_1$ is discontinuous. When the first active switch transistor $Q_1$ is again turned on by high-frequency PWM, the second energy-transferring path Path 2 is again formed to thus operate cyclically.

Figure 17A:
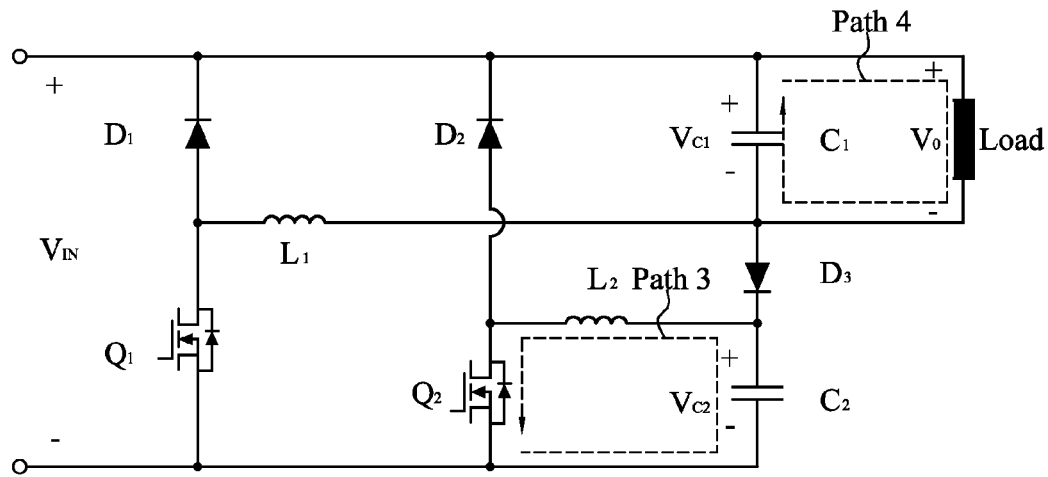
FIGS. 17(A), 17(B) and 17(C) illustrate circuit operations of the buck power factor correction system in FIG. 14 when an input voltage is smaller than a voltage of the first storing device.

Next, a mode 3 shall be discussed. In this embodiment, when the input voltage $V_{IN}$ is smaller than the voltage $V_{C1}$ of the first storing device 31 (the capacitor $C_1$), the second converter device T2 starts to operate to form a third energy-transferring path Path 3. The third energy-transferring path Path 3 is formed by the second storing device 32 (the capacitor $C_2$) and the second converter device $T_2$. A fourth energy-transferring path Path 4 is also formed between the first storing device 31 (the capacitor $C_1$) and the load. Under this mode, the first energy-transferring path Path 1 and the second energy-transferring path Path 2 are non-existent. Further, the fourth energy-transferring path Path 4 is formed by a loop between the first storing device 31 (the capacitor $C_1$) and the load, as shown in FIG. 17(A).

Figure 17B:
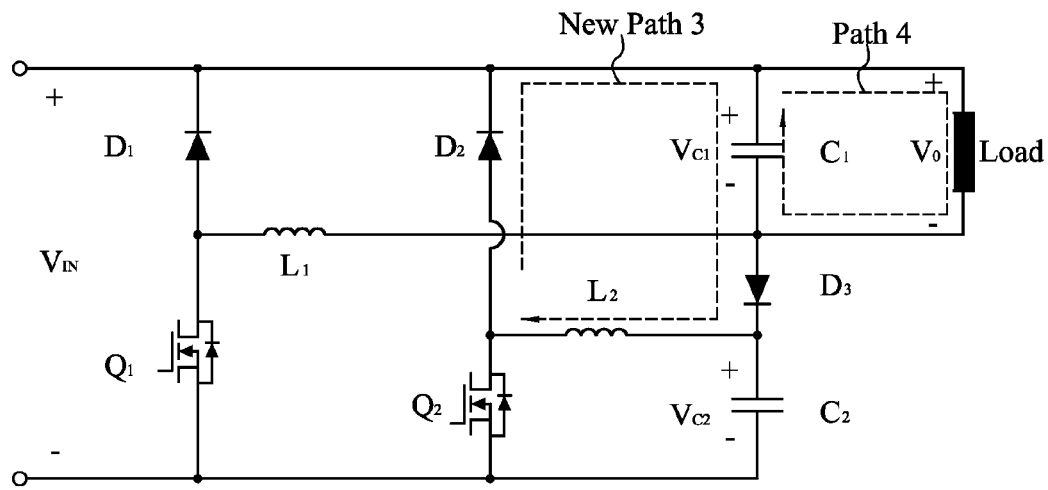

Under the mode 3, when the second active switch transistor $Q_2$ in the second converter device $T_2$ is turned on by high-frequency PWM and the second diode $D_2$ is off, a third energy-transferring path Path 3 is formed. The third energy-transferring path Path 3 is formed by a loop of the second inductor $L_2$, the second active switch transistor $Q_2$ and the second storing device 32 (the capacitor $C_2$). The second energy-storing capacitor $C_2$ charges the second inductor $L_2$ at this point. When the high-frequency PWM at the second active switch transistor $Q_2$ is turned off, the second diode $D_2$ in the second converter device $T_2$ becomes turned on to form a new third energy-transferring path New Path 3, which is formed by a loop of the first storing device 31 (the capacitor $C_1$), the second inductor $L_2$, the second diode $D_2$ and the switch element 34 (the diode $D_3$). Further, the energy in the second inductor $L_2$ is discharged to the first energy-storing capacitor $C_1$ via the newly formed path New Path 3, as shown in FIG. 17(B).

Figure 17C:
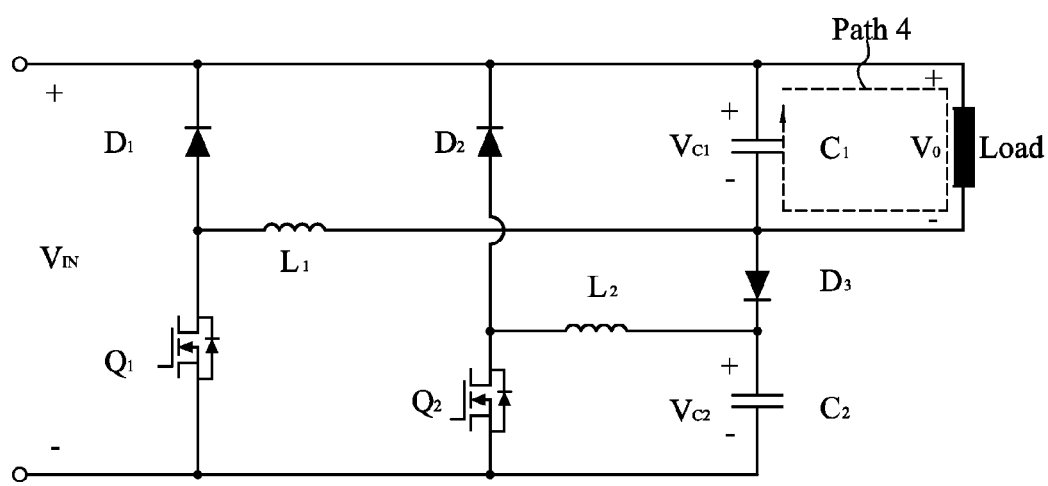

Referring to FIG. 17(C), when the energy in the second inductor $L_2$ is completely discharged to the first storing device 31 (the capacitor $C_1$) via the new third energy-transferring path New Path 3, the second diode $D_2$ and the second active switch transistor $Q_2$ in the second converter device $T_2$ become turned off such that the newly formed second energy-transferring path New Path 3 disappears, while the fourth energy-transferring path Path 4 remains unchanged—such stage only takes place when the current of the second inductor $L_2$ is discontinuous. When the second active switch transistor $Q_2$ is again turned on by high-frequency PWM, the third energy-transferring path Path 3 is again formed to thus operate cyclically.

With description of the above embodiments, it is illustrated that the present invention is capable of directly charging a direct-link capacitor by partial energy via a current path, so as to decrease an energy-storing requirement of an inductor, reduce a volume of an inductor and optimize circuit efficiency, thereby simplifying an overall circuit structure that is then easier to control. Further, in the present invention, the energy-storing capacitance is divided into two capacitors—a first capacitor, connected in parallel with a load to stabilize the load voltage, and a second capacitor, connected in series with the first capacitor to form a voltage divider for reducing a voltage stress and a volume of the first energy-storing capacitor. The second energy-storing capacitor transfers energy to the first energy-storing capacitor via a converter circuit, so as to assist the first energy-storing capacitor in stabilizing the voltage and thus to reduce the volume of the first energy-storing capacitor. Further, since the second energy-storing capacitor allows a voltage change $\Delta V$ of a large range or even complete energy discharge, the required capacitance of the second energy-storing capacitor may also be decreased.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A buck power factor correction system, comprising:
   a first storing device, for storing and discharging energy;
   a first converter device, coupled to the first storing device, for transferring and converting energy;
   a second storing device, coupled to the first storing device, for storing and discharging energy;
   a second converter device, coupled to the second storing device, for transferring and discharging energy;
   a rectifying device, coupled to the first storing device, for receiving and rectifying a power source to generate an input voltage; and
   a load, coupled to the first storing device;
   wherein the first storing device comprises a plurality of energy-storing paths as a plurality of energy-transferring paths; and
   wherein the plurality of energy-transferring paths comprise:
      a first energy-transferring path, formed by directly charging the first and second storing devices by the input voltage;

a second energy-transferring path, formed by charging the first storing device via the first converter device by the input voltage; and a third energy-transferring path, formed by charging the first storing device via the second converter device by the second storing device.

2. The buck power factor correction system according to claim 1, wherein the first and second storing devices are capacitors.

3. The buck power factor correction system according to claim 1, wherein the rectifying device is a bridge rectifier.

4. The buck power factor correction system according to claim 1, wherein the first converter device comprises a first diode, a first active switch transistor and a first inductor; the second converter device comprises the first diode, the first active transistor, the first inductor and a second active switch transistor.

5. The buck power factor correction system according to claim 4, wherein the second active switch transistor is for low-frequency switching, the first active switch transistor is controlled by high-frequency pulse width modulation (PWM), and the pulse width is modulated via a feedback signal.

6. The buck power factor correction system according to claim 4, wherein the first diode in the first converter device is coupled to the rectifying device, the first active switch transistor in the first converter device has one end coupled to the first diode and one other end coupled to the rectifying device, the first inductor in the first converter device has one end coupled to the first diode and one other end coupled to the first storing device.

7. The buck power factor correction system according to claim 6, wherein the second active switch transistor in the second converter device has one end coupled to the first active switch transistor and one other end coupled to the second storing device.

8. The buck power factor correction system according to claim 4, wherein the first energy-transferring path is formed from the input voltage via the first and second storing devices and a bypass diode on the second active switch transistor; the second energy-transferring path is formed from the input voltage via the first storing device and the first converter device; and the third energy-transferring path is formed from the second storing devices via the second converter device and the first storing device.

9. The buck power factor correction system according to claim 8, wherein between the first storing device and the load forms a fourth energy-transferring path.

10. The buck power factor correction system according to claim 1, wherein the energy is a voltage or a current.

11. The buck power factor correction system according to claim 1, wherein the first converter device comprises a first diode, a first active switch transistor and a first inductor; the second converter device comprises a second diode, a second active switch transistor and a second inductor.

12. The buck power factor correction system according to claim 11, wherein the first active switch transistor and the second active switch transistor are controlled by high-frequency PWM, and the pulse width is modulated via a feedback signal.

13. The buck power factor correction system according to claim 11, further comprising:
a switch element, coupled between the first storing device and the second storing device.

14. The buck power factor correction system according to claim 13, wherein the first diode in the first converter device is coupled to the rectifying device, the first active switch transistor in the first converter device has one end coupled to the first diode and one other end coupled to the rectifying device, and the first inductor in the first converter device has one end coupled to the first diode and one other end coupled to the switch element.

15. The buck power factor correction system according to claim 14, wherein the second diode in the second converter device is coupled to the first diode, the second active switch transistor in the second converter device has one end coupled to the second diode and one other end coupled to the first active switch transistor, and the second inductor in the second converter device has one end coupled to the second diode and one other end coupled to the switch element.

16. The buck power factor correction system according to claim 13, wherein the switch element is a semiconductor diode.

17. The buck power factor correction system according to claim 16, wherein the first energy-transferring path is formed from the input voltage via the first and second storing devices and the semiconductor diode; the second energy-transferring path is formed from the input voltage via the first storing device and the first converter device; and the third energy-transferring path is formed by the first storing device, the second storing device and the second converter device.

18. The buck power factor correction system according to claim 17, wherein between the first storing device and the load forms a fourth energy-transferring path.

* * * * *